United States Patent [19]

Carse

[11] Patent Number: 4,706,241
[45] Date of Patent: Nov. 10, 1987

[54] LOW SPEED GATE CIRCUIT

[75] Inventor: Gregg D. Carse, Mountain View, Calif.

[73] Assignee: Pacific Bell, San Francisco, Calif.

[21] Appl. No.: 814,632

[22] Filed: Dec. 30, 1985

Related U.S. Application Data

[63] Continuation-in-part of Ser. No. 711,083, Mar. 12, 1985, abandoned.

[51] Int. Cl.4 .................... H04M 11/04; H04Q 11/04; G08C 15/08
[52] U.S. Cl. .................................. 370/60; 340/870.13; 379/50
[58] Field of Search ........................ 370/58, 89, 90, 94, 370/85, 60; 179/2 A, 5 R, 5 P; 340/825.32, 825.35, 825.36, 870.13; 379/45, 50

[56] References Cited

U.S. PATENT DOCUMENTS

| | | | |
|---|---|---|---|
| 4,097,690 | 6/1978 | Kuntz et al. | 179/5 R |
| 4,262,283 | 4/1981 | Chamberlain et al. | 179/5 R |
| 4,367,548 | 1/1983 | Cotton, Jr. et al. | 370/58 |
| 4,465,904 | 8/1984 | Gottsegen et al. | 370/85 |
| 4,602,362 | 7/1986 | Hargrave et al. | 370/58 |

Primary Examiner—Douglas W. Olms
Assistant Examiner—Frank M. Scutch, III
Attorney, Agent, or Firm—Fitch, Even, Tabin & Flannery

[57] ABSTRACT

A gate circuit is described for use in a telephone system which includes one or more ports located on a subscriber's premises for connecting equipment on these premises to a specified vendor of services having equipment at a remote location. The gate circuit simulates a hard wired connection between the ports on the subscriber's equipment and the vendor's equipment.

16 Claims, 4 Drawing Figures

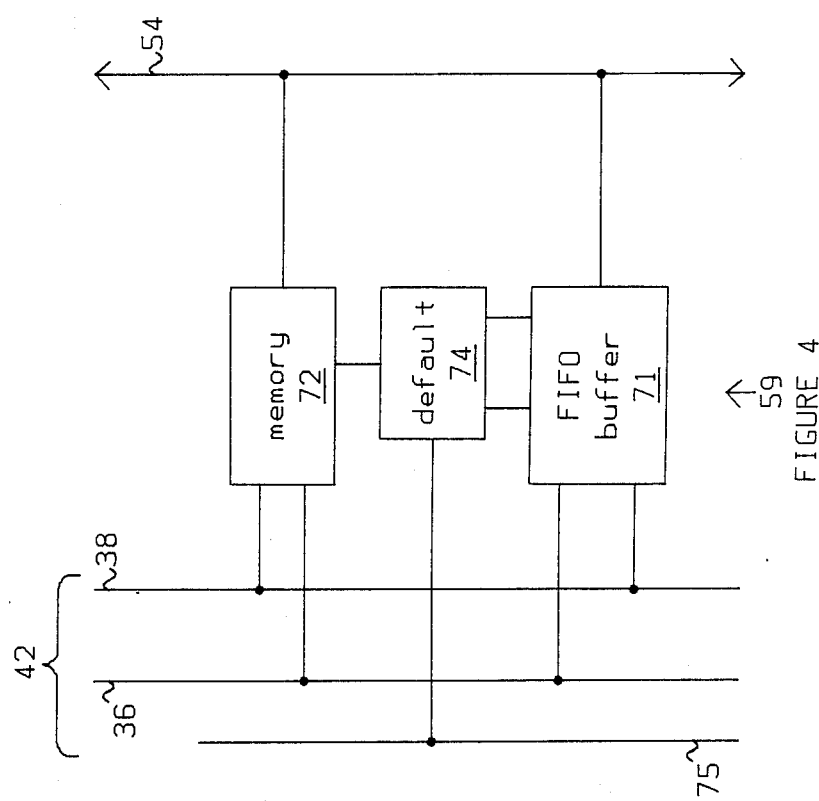

LOW SPEED GATE CIRCUIT

This applicaton is a continuation-in-part of a copending applicaton entitled "Telephone System", U.S. patent application Ser. No. 711,083, filed on Mar. 12, 1985, now abandoned.

BACKGROUND OF THE INVENTION

The present invention relates broadly to switching circuits for use in telephone systems and, more particularly, to routing circuits for routing digital data between a subscriber of a service which requires that data be transmitted between said subscriber's premises and the premises of the vendor of said service.

A number of desirable services could be made available to subscribers if each subscriber's premises could be directly connected to a vendor of each such service. In general these services require the exchange of relatively low speed data between the subscriber's premises and the vendor of the service. These services include intruder detection and control, control of machinery and power monitoring, and automatic notification of emergency services. Such direct connections between the subscriber's premises and a vendor's premises without the need to provide new lines between the two premises are possible using the telephone system.

Digital telephone systems make possible the transfer of data between the central office switch to which each subscriber is connected and the subscriber's premises over the same telephone circuits which are used to transmit and receive voice signals between these two locations. Such a system is described in the copending application described above. In this system, each subscriber's premises are equipped with a remote unit which in addition to providing ordinary voice communications, also provides a number of ports for continually sending and receiving low speed digital data between devices on the subscriber's premises and corresponding devices on a vendor's premises. Data sent over each of these ports is separated at the central office switch by an interface circuit and routed, together with the identity of the sender to a gate circuit which is responsible for communicating the data to the appropriate vendor over a dedicated telephone circuit. Data to be sent to each subscriber's premises from each vendor is collected by the gate circuit and routed to the interface circuit which relays it to the appropriate subscriber's premises. Such a system simulates a permanent circuit between each vendor's premises and the premises of each subscriber of that vendor's service.

The number of subscribers that can be serviced by each vendor over a telephone circuit connecting that vendor to the gate circuit depends on the number of data words being exchanged over the telephone circuit in question. Hence one wishes to minimize unnecessary traffic on this telephone circuit. One problem inherent in simulating a connection between the subscriber's and vendor's premises by continually transferring data words between the two locations is that the volume of traffic on the telephone circuit connecting the vendor to the gate circuit can be quite high, particularly, if that vendor must service a large number of subscribers. In many cases, a large fraction of this traffic is not needed to adequately provide the service in question. For example, in an intruder alarm system, the vendor is only interested in receiving information indicating that one or more alarm circuits has been actuated. Hence, continually sending the status of the alarm circuits in question to the vendor creates unnecessary traffic on the telephone circuit connecting the vendor to the gate circuit. Similarly, when the vendor has nothing to communicate to a particular subscriber, a default data word must still be sent to that subscriber which creates unnecessary traffic on the telephone circuit in question.

It is an object of the present invention to provide an improved gate circuit for routing digital data to and from each of a plurality of vendors over a telephone circuit.

It is a further object of the present invention to provide a gate circuit which minimizes unnecessary traffic on the telephone circuit connecting said gate circuit to a specific vendor of services.

These and other objects of the present invention will be apparent from the following detailed description of the invention and the accompanying drawings.

SUMMARY OF THE INVENTION

The present invention comprises a gate circuit for use in a telephone system which includes one or more ports located on a subscriber's premises for connecting equipment on said premises to a specified vendor of services located at a location remote from said premises. The telephone system includes a time multiplexed input serial data stream comprising a plurality of digital words in a serial format, each said digital word representing a data word input on a specific port, said port being specified by the position of said digital word in said input serial data stream relative to a synchronization signal present in said telephone system. The telephone system also includes a time multiplexed output serial data stream comprising a plurality of digital words in serial format, each said data word representing a data word received from a vendor to be sent to a specified port. The port to which said data word is to be sent is specified by position of said digital word in said output serial data stream relative to a synchronization signal present in said telephone system.

The gate circuit includes a means for coupling said gate circuit to said input serial data stream and a means for coupling said gate circuit to said output serial data stream. Each vendor is coupled to the gate circuit by a vendor coupling means which includes means for coupling each said vendor to said gate circuit by a telephone circuit. The gate circuit communicates with each vendor by exchanging digital data organized into digital words referred to as data packets. The gate circuit sends data packets to each vendor and receives data packets from each vendor over the telephone circuit connecting the vendor in question to the gate circuit. Data packets sent to a vendor comprise one or more data words from a specified port and information specifying said port. Data packets received from a vendor comprise one or more data words to be sent to a specified port and further comprise information specifying said port.

The gate circuit is coupled to the input serial data stream by a serial input interface means which determines the vendor to which each digital word in said input serial data stream is to be sent. Said serial input interface means couples the data word specified by each digital word in the input serial data stream and information specifying the port in which said digital word originated to said vendor coupling means.

A data word destined for a specified port which is received from a vendor through said vendor coupling means is placed into said output serial data stream by an output serial interface means. The output serial interface means places said word into the output serial data stream at a location relative to said synchronization pulse which will cause said data word to be sent to the port specified in the input data packet in which it was received from said vendor.

BRIEF DESCRIPTION OF THE DRAWINGS

FIG. 4 is a block diagram of the output circuit used in a vendor card.

DETAILED DESCRIPTION OF THE INVENTION

Figure 1:
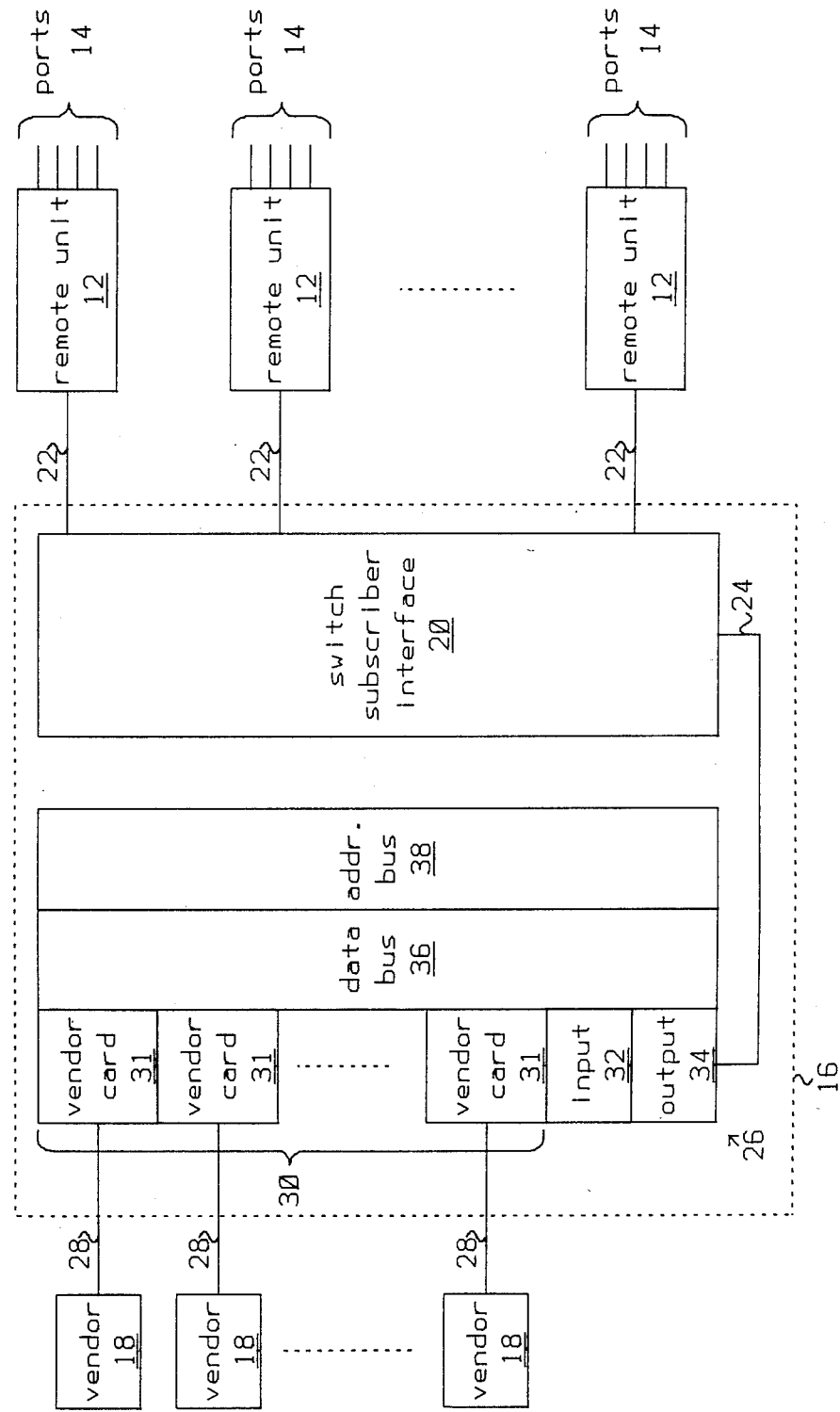
FIG. 1 is a block diagram of a digital telephone system using the gate circuit of the present invention.

The apparatus of the present invention comprises a gate circuit to be used in a digital telephone system in which each subscriber's premises include equipment which sends digital data to one or more vendors of subscriber services. In the telephone system, each subscriber's premises are connected to a central office switch by a single telephone circuit. A remote unit connected to the telephone circuit is present on each subscriber's premises. Each remote unit includes one or more ports which are used for sending and receiving digital data over the telephone circuit. Each active port on a remote unit is associated with a specific vendor when the subscriber subscribes to the vendors service. The telephone system simulates a hard wired circuit connecting each active port on a remote unit with a specific vendor.

At regular intervals, signals specifying digital data are sent from the central office switch to each remote unit. These signals consist of a digital data word sent in a serial format. The digital data includes data from one or more vendors to be relayed by the remote unit to equipment attached to a port on said remote unit. Upon receipt of a signal from the central office switch, each remote unit sends a data word to the central office switch specifying digital data representing the signals present at the input to each port on the remote unit.

Digital data received at the central office switch from each port is placed on an internal bus in the central office switch. The data on said bus is organized as a time multiplexed input serial data stream consisting of a plurality of digital data words. Each digital data word represents a data word inputted to a remote unit on a specific port. The position of each digital data word in said input serial data stream specifies the identity of the port from which the data word specified by said digital data word was sent. Each port has a unique identity in the telephone system; hence specifying a port also specifies the remote unit in which it is located. This input serial data stream is inputted to the gate circuit of the present invention which demultiplexes said data and transmits the data word specified by each digital data word in said input serial data stream to the vendor associated with the port on the remote unit through which said data word was inputted. Included with each data word sent to the vendor is the identity of the port in which it originated.

Each vendor is connected to the gate circuit of the present invention by a telephone circuit over which it sends and receives digital data. The gate circuit of the present invention routes each data word intended for a specific vendor together with data specifying the identity of the subscriber to that vendor over the telephone circuit connecting that vendor to the gate circuit. Each data word is either a terminal data word specifying digital data inputted to a port or a signal data word specifying information used to determine if the device attached to the port is still connected and to control the flow of information between said device and the vendor with which it communicates. The gate circuit of the present invention includes means for detecting valid signal data words. In order to minimize the number of data words which must be sent to each vendor, only valid signal words which differ from the previously received signal words are sent to each vendor.

Data to be sent to a remote unit on a specific port from a vendor is sent to the gate circuit of the present invention on the telephone circuit connecting said vendor to said gate circuit. The gate circuit of the present invention receives information from each vendor which specifies data words to be sent to specific ports. Said gate circuit stores this information for transmission to the appropriate ports. At regular intervals the gate circuit generates a data word to be sent to each port which is connected to the present invention. If data has been received from a vendor for a specific port, the oldest data word which has not been sent to said port is placed in an output serial data stream. If no data words have been received for transmission to a port, a default word associated with said port is sent.

Each such data word is incorporated into an output serial data stream which is placed on an internal bus in the central office switch. The output serial data stream consists of a plurality of digital data words, each said digital data word representing a data word which is to be sent to a specific port. The position of each digital data word in said output serial data stream determines the port to which said digital data word is sent by the central office switch. The central office switch includes means for demultiplexing the output serial data stream and incorporating the data words contained therein into a digital word sent to each remote unit over the telephone circuit connecting said remote unit to the central office switch.

The relevant parts of a telephone system employing the apparatus of the present invention are illustrated in FIG. 1. Each subscriber's premises are connected to a central office switch 16 through a remote unit 12. The remote unit 12 may include means for sending and receiving voice signals over the telephone system in addition to one or more ports 14 for sending data to and receiving data from vendors 18 of services such as burglar alarm systems. When a subscriber subscribes to such a service, one of the ports 14 in the remote unit 12 is dedicated to that vendor's service. The telephone system simulates a permanent circuit between said port and said vendor's premises.

Each port 14 in the remote unit 12 is configured to accept digital data in one or more standard formats from a device on the subscriber's premises. For the purpose of this discussion, an RS232C asynchronous byte format will be assumed. However, other formats will be apparent to those skilled in the art. An asynchronous byte formatted port 14 has 8 lines which are used to send and receive digital data. Data is sent from the remote unit to the device connected to it on one of these lines and received from said device on a second of these lines. The data is sent in a serial format and hence only one line is needed. A third line is used for signal ground.

The remaining lines, referred to as signal lines, hereinafter, may be used to control the flow of data through the port 14 and to determine if the equipment which is supposed to be connected to the port 14 is in fact connected. For example in a burglar alarm system, the central office (i.e., the vendor) must be able to detect an interruption in the connection of the circuits on the subscriber's premises to the port 14 to which these circuits are connected. That is, the vendor must be able to detect a burglar who disconnects the alarm system in addition monitoring the various circuits in the alarm system.

Flow control is used when the devices sending and receiving data over the RS232-C link transmit and receive data at rates which are higher than the rate at which these devices can actually process said data. These devices include buffers for storing the data received by the device. When this buffer is full, the device can not accept any new data until it finishes processing the data already in the buffer. Such devices use the flow control lines to signal the device sending the data to stop sending data. When the buffer has room for more data, the device in question changes the state of the appropriate signal line to indicate that data can once again be sent to it.

The telephone system simulates a permanent circuit between the port 14 and the vendor's premises by periodically sending and receiving data words to and from said port. A device connected to an RS232-C port sends data in 8 bit words in a serial format over one of the eight lines. These 8 bits should not be confused with the 8 lines which are part of the RS232-C port. When the port 14 has received all 8 bits, it transmits a data word specifying the data together with a 9th bit which specifies that the data word constitutes terminal data. Periodically, the port 14 samples the state of the signal lines and sends a data word specifying the state of the signal lines. The 9th bit in this word specifies that it contains signal data. Since the signal lines change state much less frequently than the lines used to transmit and receive data, data specifying the state of these lines need be sent less frequently. This division of the data into terminal data and signal data increases the efficiency of utilization of the limited bandwidth telephone circuit connecting the subscriber's premises with the central office switch 16.

The exchange of data between each remote unit 12 and the central office switch 16 is under the control of a switch-subscriber interface 20. Each remote unit 12 is connected to said switch-subscriber interface 20 by a telephone circuit 22 which is preferably a twisted pair of copper conductors. Periodically, the switch-subscriber interface 20 sends a serially formatted digital data word to each remote unit 12 over the telephone circuit 22. In the preferred embodiment, this word consists of a plurality of data bits which are divided into several groups. One of these groups is used to encode data specifying the bit pattern to be reproduced on each of the active ports 14 in the remote unit 12. Other data groups are used to encode data specifying voice signals to be reproduced on one or more telephone sets attached to said remote unit 12. Telephone systems in which voice signal data is sent in separate digital words will be apparent to those skilled in the art.

When a remote unit 12 receives a data,word from the switch-subscriber interface 20, it outputs the signals specified by said data word through the appropriate port on the remote unit 12 and prepares a data word for transmission back to the switch-subscriber interface 20 which includes a group of bits used to encode either terminal data specifying a data word inputted from the device connected to each active port 14 of the remote unit 12 or signal data specifying the state of the signal lines in each active port of the remote unit 12. Other data groups in this data word may be used to encode data specifying voice signals detected on one or more telephones connected to the remote unit 12.

The data groups send to the switch-subscriber interface 20 by each remote unit 12 representing either terminal data or signal data on each active port 14 of that remote unit are accumulated by the switch-subscriber interface 20 until it has one data word for each port connected to it. These data words are then sent to the gate circuit 26 of the present invention over a bus 24 which is preferably a twisted pair of conductors. The data words are time multiplexed to produce an input serial data stream on bus 24. The input serial data stream consists of a plurality of digital data words in a time multiplexed serial format, one such digital data word represents the data word sent from each active port 14 connected to the switch-subscriber interface 20. The identity of the port 14 in which each data word originated is specified by the location of said data word in said input serial data stream. The beginning of the input serial data stream is determined by a synchronization signal generated from a clock in the central office switch 16.

The gate circuit 26 decodes the input serial data stream into a data word and a tag specifying the port 14 in which said data word originated. This information is then transmitted to the appropriate vendor 18 over a telephone circuit 28 which connects that vendor to the gate circuit 26. The identity of the vendor 18 who is to receive each data word in the input serial data stream is stored in the gate circuit 26. When a subscriber subscribes to a vendor's service, a port 14 on said subscriber's remote unit is dedicated to this vendor. The identity of that port 14 and of the vendor in question is stored in the gate circuit 26 at the time of subscription.

The gate circuit 26 receives data from each of the vendors which is to be transmitted to specific ports 14 connected to the switch-subscriber interface 20. This data is sent in a digital format over the telephone circuits 28 used for connecting each vendor with the gate circuit 26. This data consists of one or more data words and the identity of the port 14 to which the data words are to be sent. Each data word represents either terminal data to be transmitted to the device connected to the identified port or signal data to be used to update the state of the signal lines on the identified port. The gate circuit 26 stores this data until the switch-subscriber interface 20 requests a data word to be sent to each active port 14 connected to it. When such a request is made, the gate circuit 26 places an output serial data stream on bus 24.

The output serial data stream consists of a plurality of digital data words in a time multiplexed serial format analogous to that used for the input serial data stream. One such digital data word represents a data word to be sent to each active port 14 connected to the switch-subscriber interface 20. The port 14 to which each data word is to be sent is specified by the position of the corresponding digital data word in said output serial data stream. The switch-subscriber interface 20 demultiplexes these data words and encodes the bit pattern of each data word into digital words sent by it to each remote unit 12 on a telephone circuit 22.

The data word placed in said output serial data stream for a given port 14 is the oldest data word received from a vendor for that port which has not yet been sent to that port. If no such data word has been received, a default word consisting of signal data is generated by the gate circuit 26.

The generation of default words in the gate circuit 26 relieves the vendor's premises equipment of the need to produce default words when there is no new data to be sent to a specific port 14. In addition to reducing the complexity of the vendor's equipment, this reduces the amount of data which must be sent over each of the telephone circuits 28. This allows a given vendor to service more ports 14 than would be possible if each vendor was required to generate default words in the vendor's equipment.

Broadly, the gate circuit 26 consists of three functional elements, a vendor interface circuit 30, a serial input interface circuit 32, and a serial output interface circuit 34. The vendor interface circuit 30 couples the gate circuit 26 to each of the vendors by one of the telephone circuits 28. It is responsible for sending and receiving data packets in a standard digital format between each vendor and the gate circuit 26. Preferably, the data packets are sent in the X.25 digital format recommended by the International Telephone and Telegraph Consultative Committee. Other formats will be apparent to those skilled in the art. Each data packet sent to a vendor contains one or more data words from ports 14 coupled to the switch-subscriber interface 20 together with information specifying the identity of the port 14 in which each data word originated. Each data packet received from a vendor contains one or more data words to be sent to specific ports 14 connect to the switch-subscriber interface 20 together with information specifying the port which is to receive each data word. In the preferred embodiment, the vendor interface circuit 30 includes one vendor card 31 for each vendor connected to the gate circuit 26. Each vendor card 31 performs the above functions for data packets sent to or received from the vendor connected to said vendor card 31.

The serial input interface circuit 32 receives the input serial data stream from the switch-subscriber interface 20 and demultiplexes the input serial data stream. Each word in said input serial data stream is assigned an address which specifies the vendor to which it is to be sent and the port 14 in which it originated. When a subscriber subscribes to a specific vendor's service, information is stored in a table in the serial input interface circuit 32 which associates the vendor's identity with a port 14 on the the subscriber's remote unit. Since the data word corresponding to this port is always located at the same position in the input serial data stream, this table consists of an address to be assigned to each digital word in the input serial data stream according to its position in the input serial data stream. The first word in the input serial data stream being assigned to the first address, the second word in the input serial data stream being assigned to the second address, and so on. Each data word is sent to the vendor interface circuit over a data bus 36 connecting the vendor interface circuit 30 to the serial input interface circuit 32. The address associated with each data word is sent to the vendor interface circuit 30 over an address bus 38 connecting the vendor interface circuit 30 with the serial input interface circuit 32.

The serial output interface circuit 34 generates the output serial data stream which consists of data words to be sent to each active port 14 connected to the switch-subscriber interface 20. The output serial data stream is generated in response to a signal from the switch-subscriber interface 20. Upon receipt of this signal, the vendor interface circuit 30 is used to generate a data word for each active port 14 and to transmit that data word to the serial output interface circuit 34 over the data bus 36 which is also connected to serial output interface circuit 34. The identity of the port 14 for which each data word is to be generated is placed on the address bus 38. The serial output interface circuit 34 orders these data words according to information contained in a table contained in the serial output interface circuit 34 so that the position of the data word in the output serial data stream identifies the port 14 to which that data word is to be sent. This table consists of one entry for each possible address, said entry giving the position in the output serial data stream to be used for the data word associated that address when said address is received from the vendor interface circuit 30.

Figure 2:
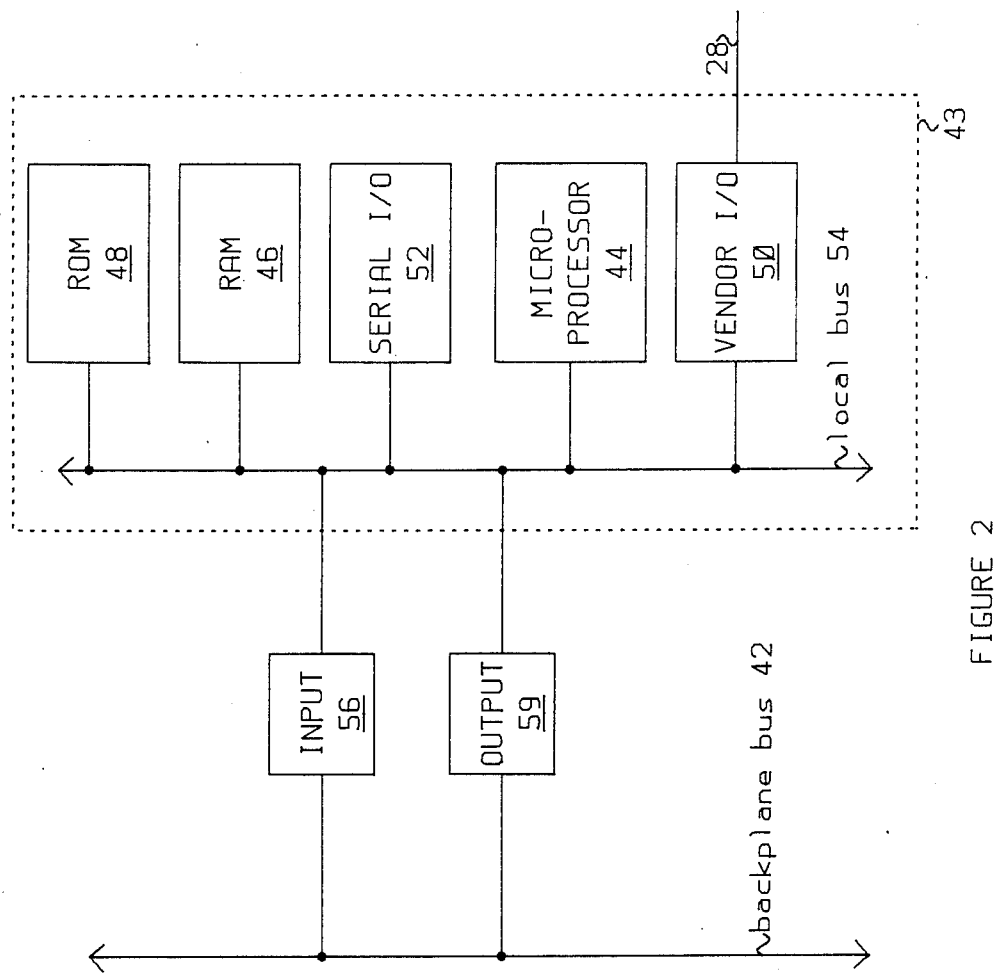
FIG. 2 is a block diagram of a vendor card.

A block diagram of the preferred embodiment of the vendor cards 31 is shown in FIG. 2. Each vendor card is connected to the serial input interface circuit 32 and serial output interface circuit 34 via a back plane bus 42 which includes the data bus 36 and the address bus 38. Each vendor card 31 includes a microcomputer 43 including a microprocessor 44, a read-write memory 46, read only memory 48, an X.25 interface circuit 50 for connecting the vendor card 31 to a vendor 18 via an X.25 interface circuit 28, and serial interface circuit 52 for connecting the vendor card 31 to a console used to monitor its operations. These circuits are connected by a local bus 54. Each vendor card 31 also includes an input circuit 56 for transferring data words and address information present on the backplane bus 42 to the microcomputer and an output circuit 59 for transferring data from the microcomputer 43 to the backplane bus 42.

Figure 3:
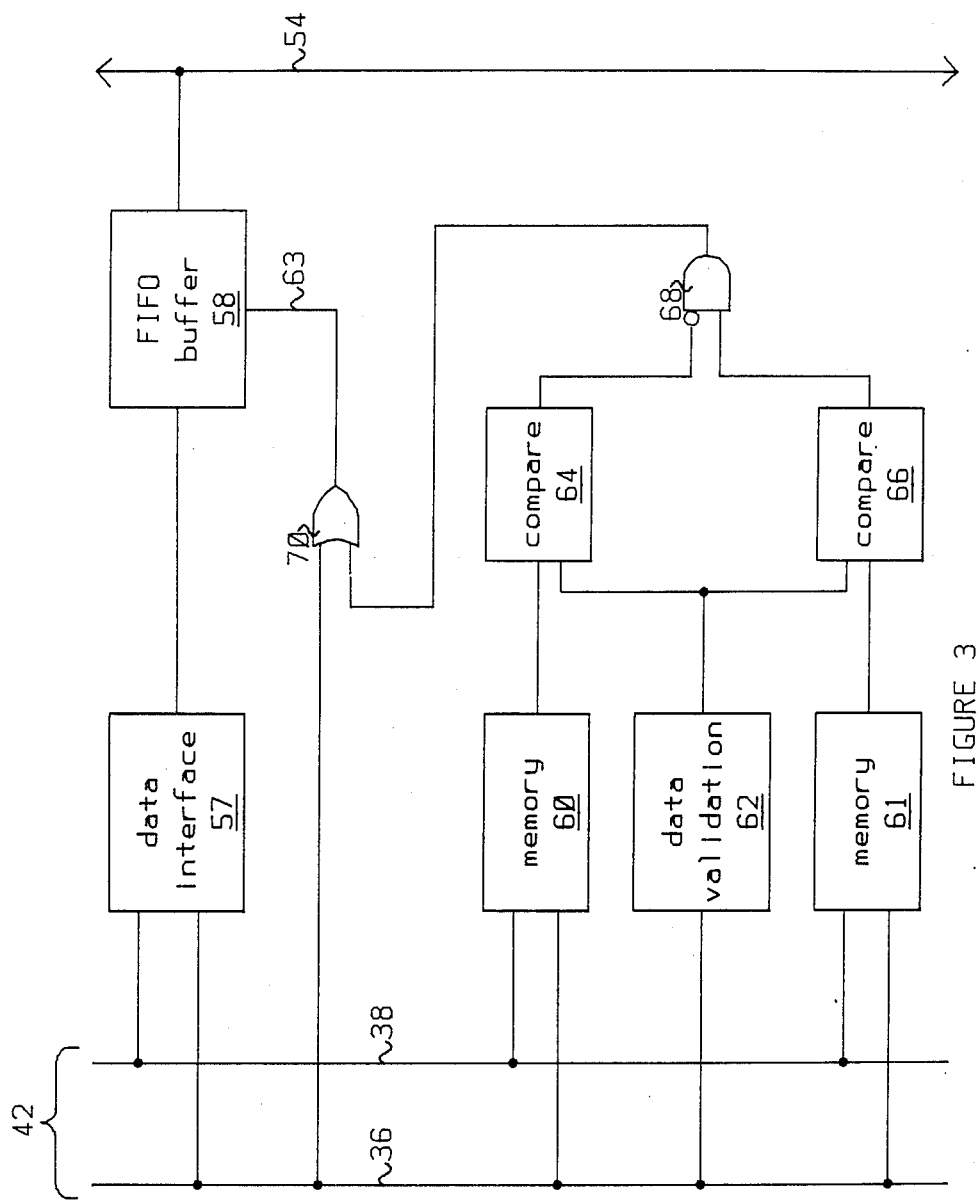
FIG. 3 is a block diagram of the input circuit used in a vendor card.

A block diagram of the input circuit 56 is shown in FIG. 3. Data words received on the backplane bus 42 to be stored in a first-in-first-out (FIFO) buffer 58 are inputted through an interface circuit 57 which reads the data word in question from the data bus 36 and the address associated with said data word from the address bus 38. The data word and the address identifying the port 14 from which said data word originated are stored in the FIFO buffer 58 which is connected to the local bus 54 in the microcomputer 43. The microcomputer 43 outputs each entry in the FIFO buffer 58 to the vendor connected to the vendor card in question when it is able.

The manner in which each data word is handled by the input circuit 56 depends on whether the data word represents terminal data or signal data. Terminal data is distinguished from signal data by one of the bits in the data word. In the preferred embodiment, each data word is 9 bits long, the 9th bit being used to specify if a given word is terminal data or signal data. If the word represents terminal data, this bit was set to a "1" by the port 14 in which the data word originated. If the data word represents terminal data, it is tagged with the address from the address bus 38 and placed in the FIFO buffer 58. The bit of the data bus which identifies a data word as terminal data is used to enable the storage of the data word and address in the FIFO buffer 58 by providing a signal on an enable line 63 when said bit is a "1".

Signal data is processed in a different manner from terminal data. Signal data words have the above described 9th bit set to a "0". Only a change in the signal data is of interest. Changes in signal data which occur because of transmission error or because of transient conditions in the device connected to the port 14 in question are of no interest. Changes in signal data occur infrequently, hence words representing signal data are placed in the FIFO buffer 58 only when a change in the signal data is detected. This results in a more efficient usage of the X.25 interface circuit 28 connecting the vendor card 31 to the vendor 18. To prevent false changes in signal data resulting from noise or transmission errors from being detected, a new values for the signal data must be received twice in a row before being accepted.

When a data word comprising signal data is received over the backplane bus 42 it is tested by a circuit 62 to be sure that the data is valid; i.e., it does not contain transmission or noise errors which are detected by parity bits incorporated into the data word. If the data is not valid, no action is taken. If the data word is valid, it is compared with the last two valid data words specifying signal data which were received from the port 14 in question.

The last valid data word specifying signal data is referred to as the current signal value. One such value is stored for each port 14 serviced by the vendor card 31 in question in a first memory 60. The valid data word specifying signal data received previously to the current signal value is referred to as the previous signal value. One such word for each port 14 serviced by the vendor card 31 in question is stored in a second memory 61.

If the data word present on the data bus 36 matches the current signal value stored for the address specified on the address bus 38, and that value differs from the previous signal value for said address, a data word is placed in the FIFO buffer 58 specifying the signal values contained in said data word. The previous signal value for this address is then replaced by the current signal value and the current signal value is replaced by the data word on the data bus 36. If the data word present on the data bus 36 matches both the current signal value and the previous signal value store for the address specified on the address bus 38, no action is taken. If the data word present on the data bus 36 differs from the current signal value stored for the address specified on the address bus 38, the previous signal value for this address is then replaced by the current signal value and the current signal value is replaced by the data word on the data bus 36.

The current signal value is compared to the data word on the data bus 36 by a first comparison circuit 64. The previous signal value is compared to the data word on the data bus 36 by a second comparison circuit 66. The result of the comparison carried out by comparison circuit 64 is inverted and inputted to an AND circuit 68 together with the result of the comparison carried out by comparison circuit 66. The output of the AND circuit 68 is applied to the enable line 63 of the FIFO buffer 58 through an OR circuit 70.

A block diagram of the output circuit 59 is shown in FIG. 4. Data is received from the vendor 18 connected to the vendor card 31 in question in the form of data packets which contain one or more data words to be transmitted to ports 14 in remote units 12 connected to the switch-subscriber interface 20. Each packet contains information identifying the port to which each data word is to be sent. When a packet is received on the X.25 interface circuit 50, it is separated into data words and addresses by the microprocessor 44. The output circuit 59 includes a plurality FIFO buffers 71 for storing the data words. One FIFO buffer 71 is provided for each port 14 serviced by the vendor card 31 in question. When a data word is received for a port it is placed in that port's FIFO buffer 71. The output circuit 59 also contains a signal memory 72 in which a default signal data word is stored for each port 14 serviced by the vendor card in question.

When the serial output interface circuit 24 assembles the output serial data stream, it signals each vendor card 31 on a read enable line 75 included in the backplane bus 42. One such read enable line is provided for each vendor card 31. The serial output interface circuit 24 then sequentially places the address of each port 14 serviced by the vendor card 31 in question on placed on the data bus 36. If the FIFO buffer for this address is empty, a default selection circuit 74 enables the signal memory 72 which places the default signal data word stored in said signal memory for the address in question to be placed on the data bus 36.

Various modifications of the present invention as described above will be apparent to those skilled in the art without departing from the present invention as claimed.

What is claimed is:

1. In a telephone system which includes one or more ports located on a subscriber's premises for connecting equipment on said premises to a specified vendor or services located at a location remote from said premises, said telephone system including means for generating a time multiplexed input serial data stream comprising a plurality of digital words in a serial format, each said digital word representing a data word input on a specific port, said port being specified by the position of said digital word in said input serial data stream relative to a synchronization signal present in said telephone system and said telephone system further including means for receiving a time multiplexed output serial data stream comprising a plurality of digital words in serial format, each said data word representing a data word to be sent to a specified port, said port being determined by position of said digital word in said output serial data stream relative to said synchronization signal, a gate circuit comprising:

means for coupling said gate circuit to said generating means;

means for coupling said gate circuit to said receiver means;

vendor coupling means for coupling said gate circuit to each of said vendors, said vendor coupling means coupling each said vendor to said gate circuit by a telephone circuit, means for sending output data packets to each said vendor including means for generating signals representing said output data packets on the said telephone circuit coupling said vendor to said gate circuit, each said output data packet including one or more data words from a specified port and information specifying said port, and means for receiving input data packets from each said vendor including means for receiving signals representing said input data packets on the said telephone circuit coupling said vendor to said gate circuit, each said input data packet including one or more data words to be sent to a specified port and information specifying said port;

serial input interface means connected to said input serial data stream coupling means for determining the vendor to which each digital word in said input serial data stream is to be sent and for coupling the data word specified by each said digital word and information specifying the port in which said digital word originated to said vendor coupling means; and serial output interface means connected to said output serial data stream coupling means and said vendor coupling means for placing a data word received from a vendor which is to be sent to a specified port into said output serial data stream at a location relative to said synchronization pulse which will cause said data word to be sent to the port specified in the input data packet in which it was received from said vendor.

2. The gate circuit of claim 1 wherein said serial input interface means further comprising:

means for detecting said synchronization signal;

means for detecting each digital word in said input serial data stream and its time of detection relative to said synchronization signal;

means for determining the vendor to which the data word represented by said digital word is to be sent, said means being responsive to said time of detection; and means for specifying the port from which said data word was sent.

3. The gate circuit of claim 1 wherein said serial output interface means further comprises:

means for detecting said synchronization signal;

means for receiving a data word and information specifying the port to which said data word is to be sent from said vendor coupling means; and means for placing said data word in said output serial data stream at a specified time relative to said synchronization signal, said specified time being chosen to cause a digital word representing said data word to be sent by said telephone system to said specified port.

4. The gate circuit of claim 1 wherein each said data word is either a terminal data word or a signal data word and wherein said vendor coupling means further comprising:

means for distinguishing signal data words from terminal data words;

means for storing a current signal data word and a previous signal data word for each port;

means for determining if a signal data word is valid;

means for comparing a signal data word received from a port with the current signal data word and previous signal data word stored for said port in said storage means;

means for outputting said signal data word only if it was the same as said current signal data word for said port on said subscriber unit and it was different from said previous signal data word; and means for replacing a previous signal data word stored in said storage means for a given port with the current signal data word stored in said storage means for said port and for replacing the current signal value for said port with said received signal data word when a valid signal data word is received for said port.

5. the gate circuit of claim 4 wherein said serial output interface means further comprising means for generating a timing signal and coupling said timing signal to said vendor coupling means; and said vendor coupling means further comprising:

means for receiving said timing signal;

means for sending a data word to each port operatively connected to said vendor coupling means in response to said timing signal, said data word being the last data word received from a vendor which was to be sent to said port and which has not yet been sent or a predetermined default word if no such word has been received from a vendor.

6. The gate circuit of claim 5 wherein said vendor coupling means further comprises:

a plurality of vendor cards, one said vendor card for each vendor coupled to said vendor coupling means, each said vendor card providing means for coupling said vendor coupling means to a said vendor;

data bus means coupled to said serial output interface means and said serial input interface means for sending data words to said serial output interface means and for receiving data words from said serial input interface means; and address bus means for specifying the vendor card through which a data word present on said data bus means is to be sent and the port from which it was received and for specifying the port to which a data word present on said data bus means is to be sent by said serial output interface means;

each said vendor card further comprising:

means for storing the identity of each port which is connected to the vendor coupled to said vendor card;

means for storing a default word to be transmitted to each said port whose identity is stored in said identity storing means;

means for storing the data words received from the vendor coupled to said vendor card; and means responsive to said timing signal for sequentially placing data specifying each port stored in said identity storing means on said address bus means and for placing a data word corresponding to said port on said data bus means, said data word being the oldest data word received from said vendor for said port which has not yet been sent to said port or, if no such data word is present, the corresponding default word for said port which is stored in said default word storing means.

7. In a digital telephone system in which digital data words are exchanged between said telephone system and a vendor over a telephone circuit, each said data word being identified by an address which specifies the destination in said telephone system of said data word if said data word was received from said vendor or the source of said data word in said telephone system if said data word is being sent to said vendor, a vendor interface circuit comprising:

means for coupling said vendor interface circuit to an address bus for receiving an address;

means for coupling said vendor interface circuit to a data bus for sending and receiving data words;

output data means coupled to said address coupling means and said data bus coupling means for storing a data word and an address associated with said data word when said data word and said address are coupled to said vendor interface circuit by said data bus coupling means and said address coupling means, respectively;

telephone circuit coupling means for coupling said vendor interface circuit to a telephone circuit connecting said vendor interface circuit with said vendor;

input data means coupled to said address coupling means and said data bus coupling means for storing a data word and an address associated with said data word when said data word and said address are received from said vendor on said telephone circuit coupling means and for storing a default data word for each possible address;

read enable means for causing said vendor interface circuit to place a data word stored in said input data means on said data bus to be sent by said telephone system to the address present on said address bus; and vendor interface means coupled to said telephone circuit coupling means, said output data means and said input data means for sending each data word stored in said output data means to said vendor over said telephone circuit coupling means and for receiving one or more data words together with an address to be associated with each of said data words from said vendor and for causing said data words and addresses to be stored by said input data means.

8. The vendor interface circuit of claim 7 wherein said telephone circuit coupling means includes means for transmitting data in the X.25 standard format.

9. The vendor interface circuit of claim 7 wherein said data words are either terminal data words or signal data words and said output data means comprises:

output FIFO buffer means for storing data words to be sent to said vendor in the order in which said data words were received by said vendor interface circuit;

means for distinguishing terminal data words from signal data words;

means for causing a terminal data word detected on said data bus coupling means to be stored in said output FIFO buffer together with the address detected on said address bus coupling means;

means for storing a current signal data word and a previous signal data word for each possible address;

means for determining if a signal data word is valid;

means for comparing a valid signal data word received on said data bus means with the current signal data word and the previous signal data word stored for the address present on said address bus coupling means;

means for storing said valid signal data word in said FIFO buffer means only if it is the same as said current signal data word and it is different from said previous signal data word; and means for replacing a previous signal data word stored in said storage means for a given address with the current signal data word stored in said storage means for said address and for replacing the current signal value for said address with said received valid signal data word when a valid signal data word is received for said address.

10. The vendor interface circuit of claim 7 wherein said input data means comprises:

input FIFO buffer means for storing data words to be sent to said telephone system in the order in which said data words were received from said vendor;

default word storage means for storing a default word for each possible address; and means responsive to said read enable means for causing the oldest data word in said input FIFO buffer means for the address on said address bus coupling means to be placed on said data bus coupling means or, if no word is present in said input FIFO buffer means for said address, for causing the default word stored for said address to be placed on said data bus coupling means.

11. In a digital data transmission system for coupling each of a plurality of locations to a specified vendor location, said system including a time multiplexed input serial data stream comprising a plurality of digital words in a serial format, each said digital word representing a data word originating at a location in said system specified by the position of said digital word in said input serial data stream relative to a synchronization signal present in said system and a time multiplexed output serial data stream comprising a plurality of digital words in serial format, each said data word representing a data word to be sent to a specified location, said location being determined by position of said digital word in said output serial data stream relative to said synchronization signal, a gate circuit comprising:

means for coupling said gate circuit to said input serial data stream;

means for coupling said gate circuit to said output serial data stream;

vendor coupling means for coupling said gate circuit to each of said vendors, said vendor coupling means including means for sending output data packets to each said vendor, each said output data packet including one or more data words from a specified location and information specifying said location, and means for receiving input data packets from each said vendor, each said input data packet including one or more data words to be sent to a specified location and information specifying said location;

serial input interface means connected to said input serial data stream coupling means for determining the vendor to which each digital word in said input serial data stream is to be sent and for coupling the data word specified by each said digital word and information specifying the location in which said digital word originated to said vendor coupling means; and serial output interface means connected to said output serial data stream coupling means and said vendor coupling means for placing a data word received from a vendor which is to be sent to a specified location into said output serial data stream at a position relative to said synchronization pulse which will cause said data word to be sent to the location specified in the input data packet in which it was received from said vendor.

12. The gate circuit of claim 11 wherein said serial input interface means further comprising:

means for detecting said synchronization signal;

means for detecting each digital word in said input serial data stream and its time of detection relative to said synchronization signal;

means for determining the vendor to which the data word represented by said digital word is to be sent, said means being responsive to said time of detection; and means for specifying the location from which said data word was sent.

13. The gate circuit of claim 11 wherein said serial output interface means further comprising:

means for detecting said synchronization signal;

means for receiving a data word and information specifying the location to which said data word is to be sent from said vendor coupling means; and means for placing said data word in said output serial data stream at a specified time relative to said synchronization signal.

14. The gate circuit of claim 11 wherein each said data word is either a terminal data word or a signal data word and wherein said vendor coupling means further comprising:

means for distinguishing signal data words from terminal data words;

means for storing a current signal data word and a previous signal data word for each location;

means for determining if a signal data word is valid;

means for comparing a signal data word received from a location with the current signal data word and previous signal data word stored for said location in said storage means;

means for outputting said signal data word only if it was the same as said current signal data word for said location on said subscriber unit and it was different from said previous signal data word; and means for replacing a previous signal data word stored in said storage means for a given location with the current signal data word stored in said storage means for said location and for replacing the current signal value for said location with said received signal data word when a valid signal data word is received for said location.

15. The gate circuit of claim 14 wherein said serial output interface means further comprising means for generating a timing signal and coupling said timing signal to said vendor coupling means; and said vendor coupling means further comprising:

means for receiving said timing signal;

means for sending a data word to each location operatively connected to said vendor coupling means in response to said timing signal, said data word being the last data word received from a vendor which was to be sent to said location and which has not yet been sent or a predetermined default word if no such word has been received from a vendor.

16. The gate circuit of claim 15 wherein said vendor coupling means further comprises:

a plurality of vendor cards, one said vendor card for each vendor coupled to said vendor coupling means, each said vendor card providing means for coupling said vendor coupling means to a said vendor;

data bus means coupled to said serial output interface means and said serial input interface means for sending data words to said serial output interface means and for receiving data words from said serial input interface means; and address bus means for specifying the vendor card through which a data word present on said data bus means is to be sent and the location from which it was received and for specifying the location to which a data word present on said data bus means is to be sent by said serial output interface means;

each said vendor card further comprising:

means for storing the identity of each location which is connected to the vendor coupled to said vendor card;

means for storing a default word to be transmitted to each said location whose identity is stored in said identity storing means;

means for storing the data words received from the vendor coupled to said vendor card; and means responsive to said timing signal for sequentially placing data specifying each location stored in said identity storing means on said address bus means and for placing a data word corresponding to said location on said data bus means, said data word being the oldest data word received from said vendor for said location which has not yet been sent to said location or, if no such data word is present, the corresponding default word for said location which is stored in said default word storing means.

* * * * *

UNITED STATES PATENT AND TRADEMARK OFFICE
CERTIFICATE OF CORRECTION

PATENT NO. : 4,706,241
DATED : November 10, 1987
INVENTOR(S) : Gregg D. Carse

It is certified that error appears in the above-identified patent and that said Letters Patent is hereby corrected as shown below:

Column 5, line 65, delete "," between the words "data" and "word".

Column 9, line 26, delete "oompared" and insert therefor --compared--.

Column 10, line 21, after "question on" insert --the address bus 38 which causes the oldest data word stored in the FIFO buffer 71 for this address to be--.

Signed and Sealed this

Twelfth Day of April, 1988

Attest:

DONALD J. QUIGG

Attesting Officer

Commissioner of Patents and Trademarks